United States Patent [19]

Sandesara

[11] Patent Number: 5,327,427
[45] Date of Patent: Jul. 5, 1994

[54] SELF-HEALING MESHED NETWORK USING LOGICAL RING STRUCTURES

[75] Inventor: Niranjan B. Sandesara, Freehold, N.J.

[73] Assignee: Bell Communications Research, Inc., Livingston, N.J.

[21] Appl. No.: 80,992

[22] Filed: Jun. 22, 1993

Related U.S. Application Data

[63] Continuation of Ser. No. 577,219, Aug. 31, 1990, abandoned.

[51] Int. Cl.$^5$ ............................................. H04J 3/02
[52] U.S. Cl. ............................ 370/85.14; 370/16.1; 370/85.12; 304/825.05
[58] Field of Search ............... 370/85.5, 85.1, 85.12, 370/85.13, 85.14, 85.15, 16.1, 16; 340/825.5, 825.05, 827; 371/8.1, 11.1

[56] References Cited

U.S. PATENT DOCUMENTS

| | | | |
|---|---|---|---|
| 3,652,798 | 3/1972 | McNeilly et al. | 179/15 |
| 3,748,647 | 7/1973 | Ashany et al. | 370/85.12 |
| 4,383,314 | 5/1983 | Tam | 370/85.12 |
| 4,575,843 | 3/1986 | David et al. | 370/85.12 |
| 4,696,001 | 9/1987 | Gagliardi et al. | 370/85.12 |
| 4,742,511 | 5/1988 | Johnson | 370/94.1 |
| 4,769,807 | 9/1988 | Niwa et al. | 370/16 |
| 4,797,882 | 1/1989 | Maxemchuk | 370/85.12 |
| 4,835,763 | 5/1989 | Lau | 370/16 |
| 4,965,790 | 10/1990 | Nishino et al. | 370/85.12 |
| 5,016,244 | 5/1991 | Massey, Jr. et al. | 370/85.4 |
| 5,042,030 | 8/1991 | Grima et al. | 370/85.12 |
| 5,087,911 | 2/1992 | Green et al. | 370/85.15 |
| 5,179,548 | 1/1993 | Sandersara | 370/85.12 |

OTHER PUBLICATIONS

"Wideband and Broadband Digital Cross-Connect Systems Generic Requirements and Objectives" Technical Reference TR-TSY-000233, Issue, 2, published Sep. 1989, pp. 5-1-5-13 by Bell Communications Research, Inc.

Primary Examiner—Douglas W. Olms
Assistant Examiner—Dang Ton
Attorney, Agent, or Firm—Leonard Charles Suchyta; Loria B. Yeadon

[57] ABSTRACT

Logical hybrid ring arrangements are disclosed which can withstand a cut communication path or a failed node. A logical ring is formed by a cascade of (i) physical hybrid ring segments, each composed of a pair of unidirectional communication paths propagating multiplexed subchannels and interposed add-drop multiplexer nodes, and (ii) cross-connect nodes terminating the segments. Each cross-connect node routes an incoming subchannel from one segment to an outgoing subchannel on another segment. Each segment may operate at a different multiplexed signal rate, so a logical ring can be composed of segments operating at different rates. Moreover, subchannels on an incoming segment may be allocated to a plurality of outgoing segments, thereby configuring multiple logical rings which may serve to balance communication traffic over the logical rings.

17 Claims, 9 Drawing Sheets

SELF-HEALING MESHED NETWORK USING LOGICAL RING STRUCTURES

This application is a continuation of application Ser. No. 07/577,219, filed Aug. 31, 1990, now abandoned.

CROSS-REFERENCE TO A RELATED APPLICATION

The following U.S. application, which is assigned to the same assignee as the instant application and is filed concurrently therewith, contains related subject matter: "A Dual-Hubbed Arrangement To Provide A Protected Ring Interconnection", Ser. No. 07/577,373 of J. Sosnosky, now U.S. Pat. No. 5,218,604, issued Jun. 8, 1993;

FIELD OF THE INVENTION

The invention relates generally to a communications network and, more specifically, to a self-heating meshed network using logical ring structures.

BACKGROUND OF THE INVENTION

A ring communications network is made up of nodes that are connected in tandem by a unidirectional communications path. Each node receives transmissions from the adjacent upstream node, and if the communication is destined for a downstream node, the communication is re-transmitted to the adjacent downstream node. Otherwise, each node transmits its own communications to the adjacent downstream node.

A drawback of such a network is that a break in the ring would prevent any node upstream of the break from communicating with any node downstream of the break. Similarly, the complete failure of a node would have the same effect as a break in the ring.

Many designs have been proposed to minimize these difficulties. The most common approach is to provide a second communications ring parallel to the first. In that case, a fault in one ring could be bypassed by transferring communications to the second ring. Alternatively, if the second ring transmitted in the opposite direction as the first, a break in both rings between two adjacent nodes could be remedied by the nodes on either side of the break looping back communications received on one ring onto the other ring. Such a system is described in McNeilly et al, U.S. Pat. No. 3,652,798.

The main problem with such approaches is that the equipment required to detect and locate a fault, and then appropriately reconnect transmitters and receivers with the alternate ring, is complicated and costly.

An approach that alleviates some of these difficulties is described in Lau, U.S. Pat. No. 4,835,763, which is assigned to the same assignee as the present invention. In Lau, a subrate multiplexed signal is utilized for ring communications. Each node has the capability of demultiplexing the main signal into its constituent subrates (channels), and channels destined for that node (local channels) are sent to receiving equipment within the node, while channels destined for downstream nodes (through channels) are multiplexed with originating local channels, and the resultant high level signal is transmitted to the adjacent downstream node. This process is simultaneously performed using identical equipment in the node for a second ring transmitting in the opposite direction. If a node detects a fault in an incoming line, an error signal is placed on all of the channels following the demultiplexing. The receiving equipment in each node includes a selector which monitors the communications arriving on each local channel from both rings. If an error signal is detected on a local channel, the selector selects the communication from the associated channel of the other ring to send to the receiver.

In this way, a break in both rings between two adjacent nodes will not cause a failure in the system, and no complicated fault locating and switching equipment is required to continue service. Similarly, the complete failure of a node will not destroy communications among the remaining nodes.

It should be noted that unlike prior survivable ring arrangements which maintain their ring characteristics following a fault, the arrangement of Lau ceases functioning as a ring if the ring is broken. However, communications among the nodes is maintained following such a break. For this reason, the arrangement of Lau has been called a hybrid ring, since it normally operates as a ring, but does not operate as a ring following a break in the ring or the loss of a node.

In Lau, an arrangement for interconnecting two autonomous but interrelated rings is disclosed. In this arrangement, simultaneous breaks in both rings can be compensated without loss of communications between any two nodes. The arrangement employs a master node from each ring and two unidirectional paths connected between the master nodes to couple the two rings. Even though the rings are protected from breaks in each ring, an outage in either master node or a unidirectional path breaks the communication path from one interrelated ring to the other.

From the aspect of the capacity of rings to carry multiplexed signals, it must be pointed out that because communication among different nodes are multiplexed to only one signal, traffic-carrying capacity (bandwidth) of this signal can be readily exhausted. When this happens, increasing ring capacity is costly and complicated. Links between all adjacent nodes as well as all nodes have to operate at the same rate, which has to be chosen to accommodate the largest anticipated combined communications requirement among all nodes. This is costly. Another problem with rings is interconnection of multiple rings. Synchronization of ring operation is complicated, especially under failure condition and when multiple rings are interconnected.

SUMMARY OF THE INVENTION

These shortcomings as well as other limitations and deficiencies are obviated in accordance with the present invention by configuring a network as a set of logical hybrid rings, each having the same self-healing properties as a physical hybrid ring and deploying the logical rings to balance communications in the network.

In accordance with the broad aspect of the present invention, a plurality of hybrid ring segments, each composed of two unidirectional paths with a number of interposed ADM nodes, terminate on cross-connect nodes which route incoming subrate channels on incoming paths to subrate channels on outgoing paths on a one-to-one basis. Each logical ring is formed from a cascade of predetermined ones of the segments and preselected ones of the cross-connect nodes in such a way that any ADM node can communicate with any other ADM on a given logical ring. To reconfigure the logical rings on a dynamic basis, a management node communicates with the cross-connect nodes and may issue reconfiguration commands to the cross-connect nodes.

DETAILED DESCRIPTION

PRIOR ART

Figure 1:
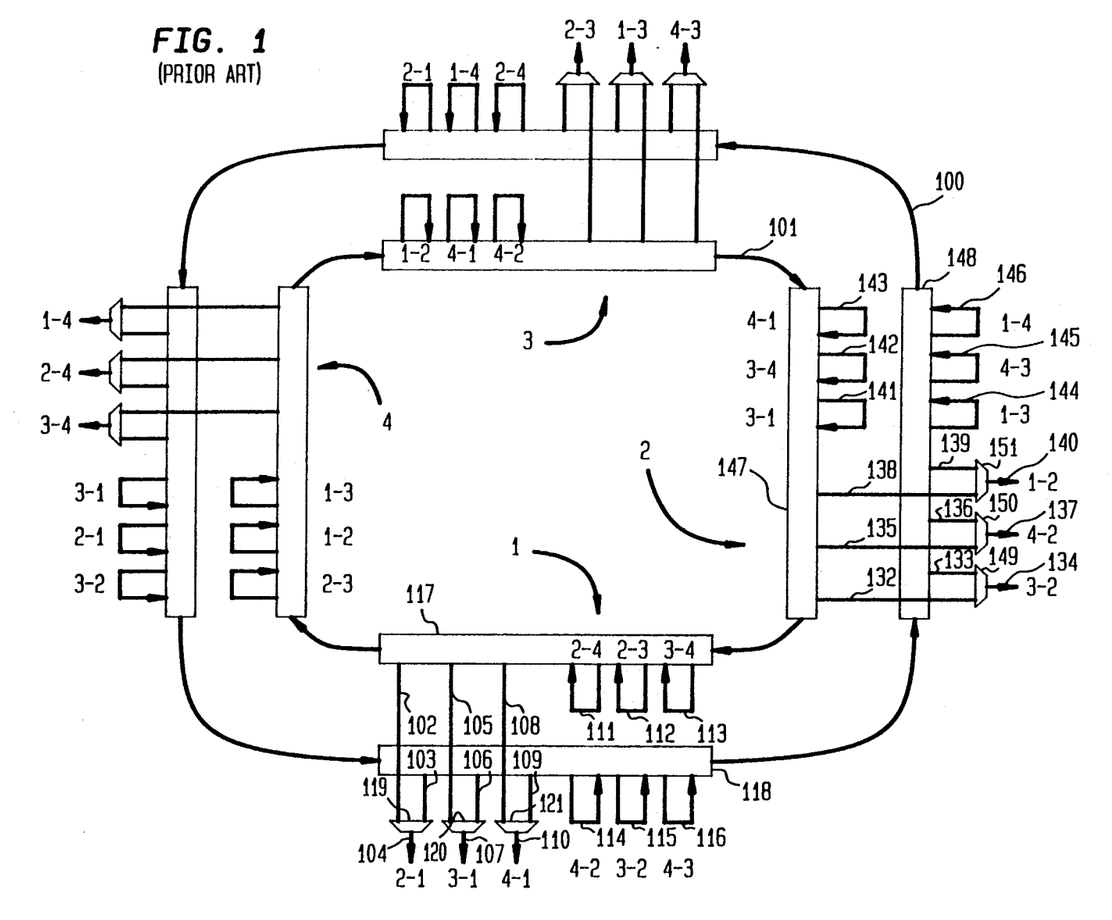
FIG. 1 is a prior art circuit diagram for the basic hybrid ring.

By way of introducing terminology and notation useful in elucidating the present invention, the basic hybrid ring network as disclosed by Lau (U.S. Pat. No. 4,835,763) is first discussed in overview fashion. The basic hybrid ring is depicted in FIG. 1, which is FIG. 1 of the Lau patent and reference should be made to the Lau patent for elements of FIG. 1 not further discussed herein. With reference to FIG. 1, node 1 comprises controllers 117 and 118 and selectors 119-121. Controller 117 is connected with ring 101, which carries signals in a clockwise direction, and controller 118 is connected with ring 100, which carries signals in a counterclockwise direction. Illustratively, the signals on each ring comprise six subrate channels, each of which is dedicated to communications between a preselected pair of basically identical nodes. Each node feeds three subrate receivers (not shown), which in the case of node 1 have lines 104, 107 and 110, respectively, as input.

The channel carrying communications between nodes 2 and 1 would be extracted from ring 101 by controller 117 (by demultiplexing the signal on ring 101), and sent to selector 119 over line 102. Controller 118 would extract the associated channel off ring 100 and send it to selector 119 over line 103. Selector 119 would select one of the signals arriving on lines 102 and 103, based on the presence or absence of an error signal on either line. The selected signal would be sent to the receiver over line 104. A transmitter (not shown) would transmit two identical signals destined for node 2, one to controller 117 and one to controller 118, for reinsertion into the respective loops.

Channels associated with communications between nodes 3 and 1, and between nodes 4 and 1, would operate in a similar manner utilizing selectors 120 and 121, respectively. Controllers 117 and 118 then multiplex the three channels originating from node 1 with the three through channels, and transmit the resultant higher level signals on their associated loops (loop 101 toward node 4 and loop 100 toward node 2). In this way, each node has two redundant communications paths to each of the other nodes, both paths being continuously active.

When a break occurs in the rings, say rings 100 and 101 are broken between node 1 and node 4, the arrangement of controllers and selectors in each node react so as to preserve communications paths among all of the nodes.

Figure 2:
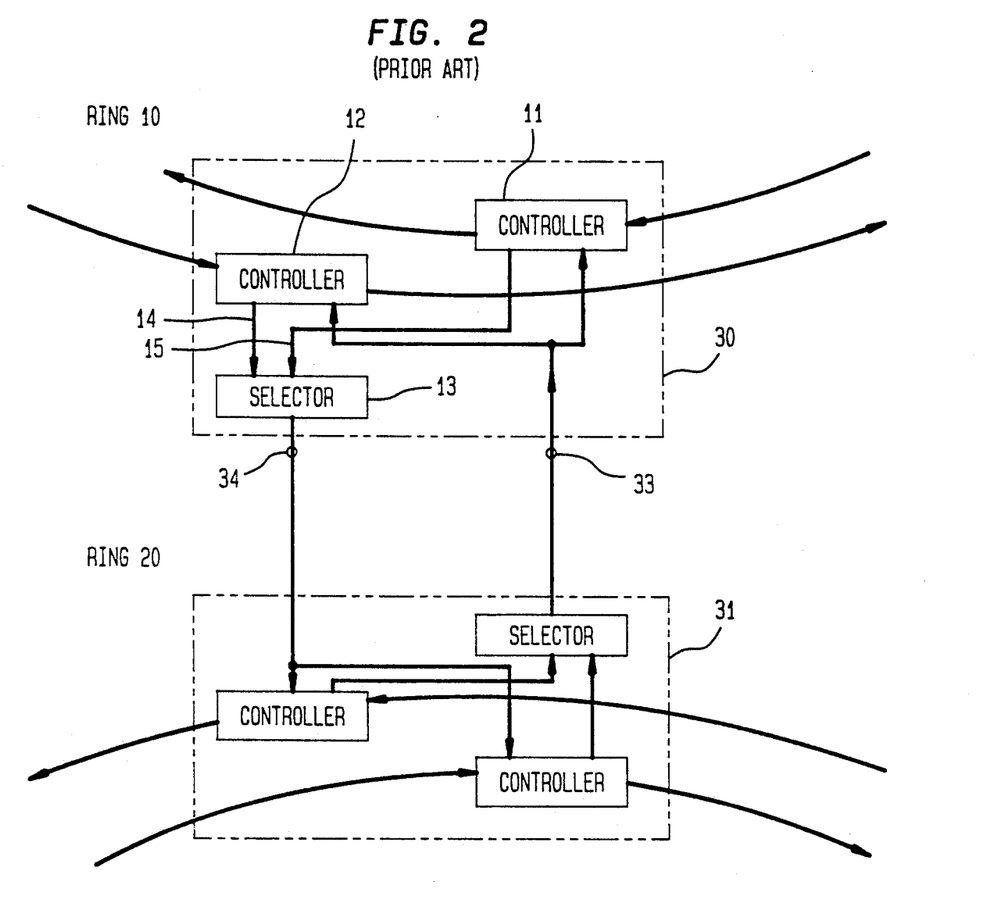
FIG. 2 is a diagram of a portion of a prior art master/master arrangement for the non-protected interconnection of two hybrid ring networks.

The arrangement shown in FIG. 2 depicts the manner of interconnecting two interrelated nodes in the master-master relationship as disclosed by Lau; the two master rings are denoted by reference numerals 10 and 20, respectively. Each ring has an interposed master node shown as nodes 30 and 31, respectively. In turn, each node includes an arrangement of two controllers 11 and 12 and a selector 13; these components are basically the same as controllers 117 and 118 and selector bank 119-121 in node 1 of Lau. Nodes 30 and 31 are interconnected by unidirectional communication paths 33 and 34. Although breaks in a ring are protected because each ring is a hybrid type, master node outages and/or a break in paths linking the master nodes are unprotected.

Finally, by way of additional terminology, the arrangement in FIG. 2 of node 30 is referred to below as an ADM (Add-Drop Multiplexer) node.

Present Invention

Figure 3:
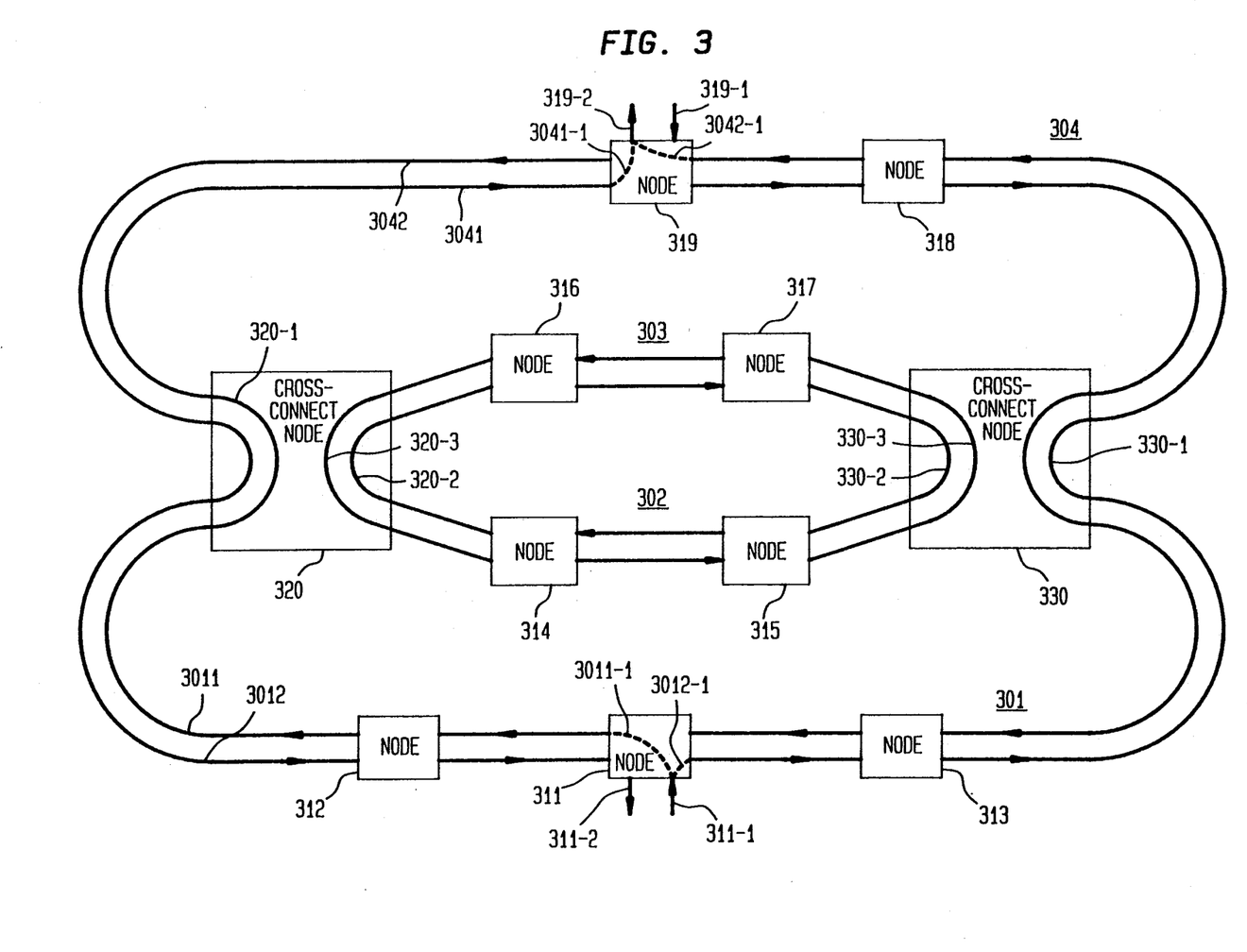
FIG. 3 is a block diagram of an arrangement in accordance with the present invention for four exemplary segments with cross-connect nodes.

An illustrative embodiment of one aspect of the present invention is depicted in FIG. 3. The network shown in FIG. 3 comprises four hybrid ring segments 301-304. Each segment is composed of two unidirectional symmetrical paths, which propagate signals at a fixed rate in opposite directions, and of a number of interposed ADM nodes all operating at the same rate as the signals. (This definition includes the special case wherein the segment only comprises two unidirectional paths, i.e., there are no ADM nodes present.) For instance, segment 301 includes unidirectional paths 3011 and 3012 and ADM nodes 311-313. Similarly, segment 304 contains unidirectional paths 3041 and 3042 as well as ADM nodes 318 and 319. All ADM nodes operate exactly as described in Lau's U.S. Pat. No. 4,835,763. A segment is referred to as a hybrid ring segment since once certain segments are connected in cascade, as discussed below, the cascade forms a hybrid ring in the sense disclosed by '763. The two signals flowing in opposite directions within a segment contain a number of multiplexed subrate channels (also referred to as subchannels below). The number of subrate channels can be different for each segment. Each end of a segment is terminated on a cross-connect node. For example, nodes 320 and 330 are cross-connect nodes on which each of the four segments 301-304 are terminated.

Each cross-connect node 320 or 330 terminates a number of segments each operating independently and possibly at a different rate. A cross-connect node accesses all the subrate channels within the terminated segments (e.g. by demultiplexing the incoming multiplexed subrate channels). In addition, the cross-connect node then routes the subrate channels to the outgoing side of preselected segments served by the cross-connect node in a predetermined manner (e.g. by switching the subrate channels). A given incoming channel is cross-connected to only one outgoing channel. (One realization of a cross-connect node is set forth in the Technical Reference TR-TSY-000233, Issue 2, published September, 1989 by Bell Communications Research, Inc. This document is incorporated herein by reference. The material in this document is rather extensive, covering an array of features and options in addition to the basic routing arrangement. The present invention utilizes only a subset of the capabilities relating to transferring input subchannels to output subchannels in a preassigned manner.) Under failure conditions all subrate channel connections within the cross-connect nodes are maintained exactly as they were before the failure occurred. Communications are effected by the usual hybrid selection process at the ADM nodes where subrate channels are demultiplexed from the higher level signal for actual drop at the ADM nodes.

Communications between nodes 311 and 319 are accomplished as follows. A transmitter (not shown) associated with node 311 inserts signal 311-1 destined for node 319 identically into subchannels 3011-1 and 3012-1 of the signals propagating on paths 3011 and 3012, respectively. At the cross-connect node 320, subchannel 3011-1 is connected to subchannel 3041-1 of the signal on path 3041 via link 320-1. Similarly, cross-connect node 330 connects subchannel 3012-1 to subchannel 3042-1 of the signal on path 3042 via link 330-1. At node 319, subchannels 3041-1 and 3042-1 are dropped from paths 3041 and 3042, respectively, and a standard ADM 2:1 selector (not shown) chooses the better of the two subchannels to be dropped as signal 319-2 leaving node 319. In this way, a signal from node 311 to node 319 has two redundant communications paths, both paths being continuously active. Also, signal 319-1 inserted at node 319 and dropped at node 311 as signal 311-2 operates in a similar manner, and also has two redundant continuously active paths.

Similarly, redundant communications paths between any ADM nodes 311-313 on segment 301 and any ADM node 318-319 on segment 304 would be provided by assigned subchannels on segment 301 and associated subchannels on segment 304 that would be connected by cross-connect nodes 320 and 330. These subchannel paths and associated cross-connections through cross-connect nodes form a ring as shown by the "outer" ring in FIG. 3, namely, the ring composed of segment 301, cross-connect node 320, segment 304 and cross-connect node 330. (As a shorthand notation useful later, the "outer ring" just described is referred to by 301*304, i.e., by the segments comprising the ring.) This ring is called a a "logical ring" as distinguished from the physical ring taught and suggested in the prior art. Redundant communications paths between two ADM nodes on the same segment (e.g. between nodes 311 and 312 on segment 301) can be provided similarly by this logical ring.

A conventional physical hybrid ring comprises a series of nodes connected in tandem and propagating one or more signals operating at a fixed rate. A logical ring is composed of two or more independent segments, each segment containing a number of ADM nodes. These segments are linked at the subchannel level using two or more cross-connect nodes. Each segment can operate at a different rate, can have a different signal structure and can contain a different number of subrate channels. Each segment can also use a different type of transmission facility, for example, copper, optical fiber or radio.

Like a conventional physical hybrid ring, a logical ring provides communications between two nodes residing on it in the event of a cut in a segment between any two nodes or failure of an intermediate node including a cross-connect node. Under such failure conditions, a logical ring operates much like a physical hybrid ring described in U.S. Pat. No. 4,835,763. All ADM nodes also operate exactly as described in '763 in that subchannels without error signals are selected over subchannels with error signals. However, even under such failure conditions no selection takes place at the cross-connect nodes between a subchannel with an error signal and an associated subchannel with a valid signal. This selection is reserved for the ADM nodes where the subchannels are demultiplexed from higher level signals.

To explain this overall functioning of a logical ring, it is supposed that one of the ADM nodes on segment 301 or 304 fails or a part of a segment between any of these ADM nodes fails. Communication between nodes 311 and 319 will be maintained since each segment exhibits hybrid ring characteristics. Illustratively, if segment 301 is cut between nodes 311 and 312, error signals will be inserted in all subchannels, except locally originated ones, within the signals leaving nodes 311 and 312. In particular, subchannel 3011-1 leaving node 312 will have an error signal, but subchannel 3012-1 leaving node 311 will have a valid signal. Cross-connections through nodes 320 and 330 will not be affected because a cross-connect node does not distinguish between a subchannel with an error signal and a subchannel with a valid signal. The embedded selector at node 319 will select and drop a valid signal, thereby maintaining communication from node 311 to node 319 via the path including path 3012 (subchannel 3012-1), node 330, and path 3042 (subchannel 3042-1). Similarly, communication from node 319 to node 311 will be maintained via path 3041 (subchannel 3041-1), node 330, and path 3011 (subchannel 3011-1).

If part of a segment between node 320 and node 312 is cut, node 320 (because it monitors incoming segments to detect loss of multiplexed signals) will insert error signals in all the subchannels received on 3011 from node 312, and then these subchannels are connected to other outgoing subchannels exactly as they were before the failure occurred. Node 312 acts as an ADM node would when an incoming signal, 3012 from node 320 in this case, fails. The selector in node 319 will select the valid signal from node 311 coming on 3042 and reject the error signal coming on 3041. Similarly, communications between any node on segment 301 and any node on segment 304 are maintained along one of the two redundant paths, if within any of the segments one cut occurs or one of the cross-connect nodes fails. Also communications between remaining nodes will be maintained if one of the ADM nodes fails. Similarly, that part of the communication between two nodes on the same segment (e.g. nodes 311 and 312) that is carried by the logical ring 301*304 will be maintained under failure condition.

Figure 4:
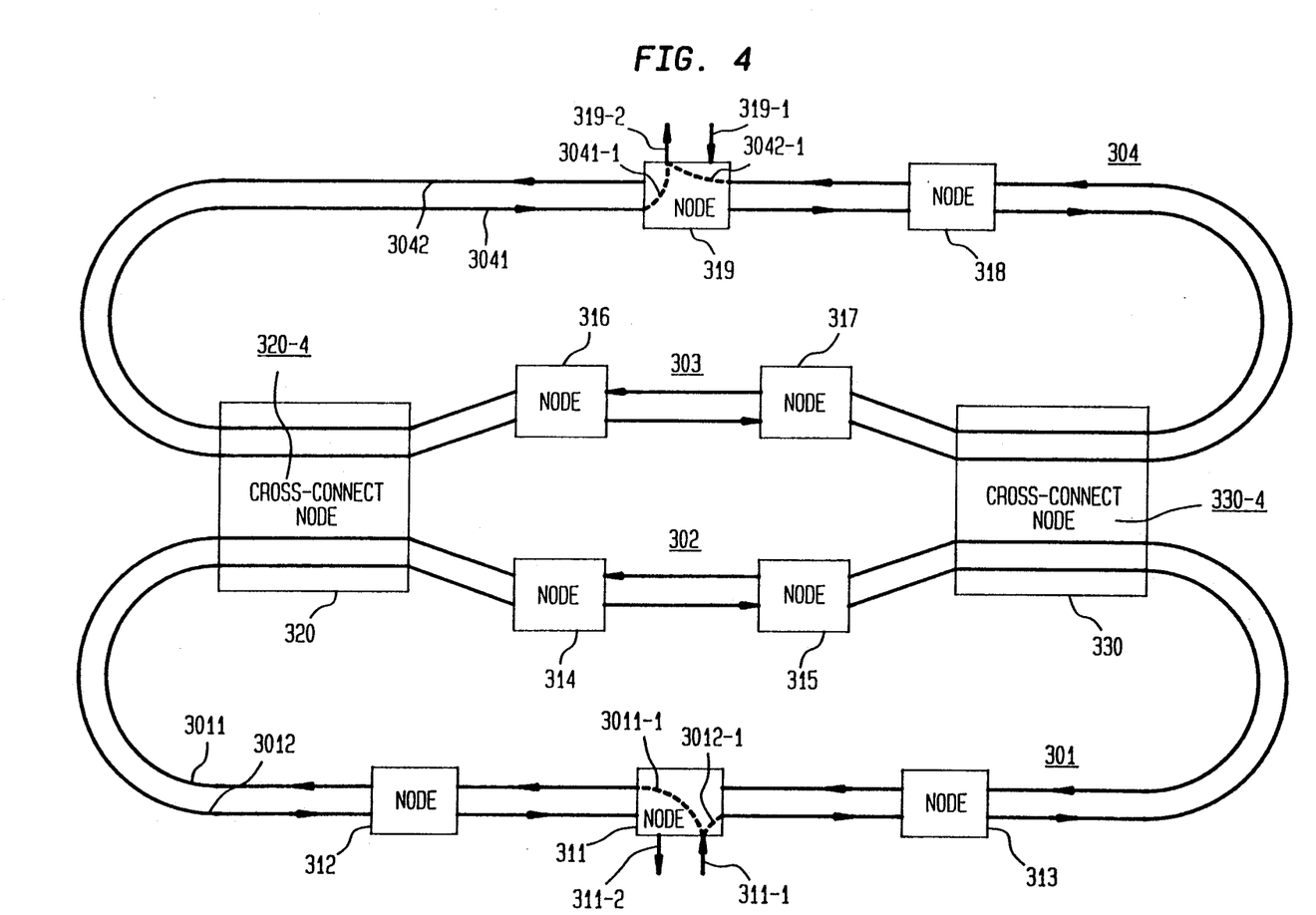
FIGS. 4 and 5 are block diagrams of alternative interconnection patterns for the segments of FIG. 3 to form other sets of logical hybrid ring networks.
Figure 5:
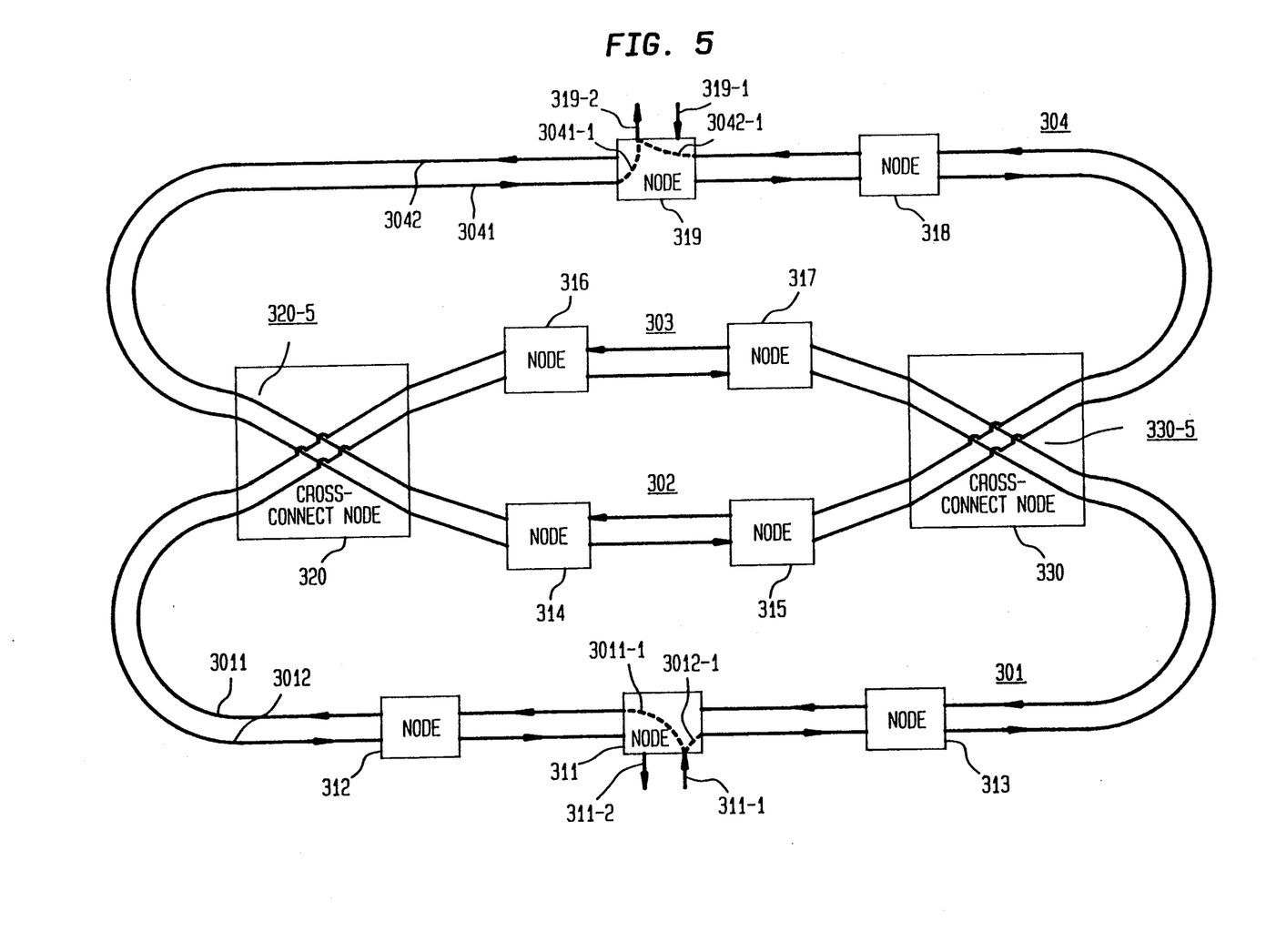

The simplicity and elegance of this aspect of the present invention becomes apparent when the subchannels within the four segments in FIG. 3 are connected to construct other logical rings as depicted in FIG. 3, FIG. 4 and FIG. 5. FIG. 3 shows another logical ring comprising segments 302 and 303 also interconnected by cross-connect nodes 320 and 330 via, for example, links 320-2 and 320-3 as well as links 330-2 and 330-3, respectively, which represent the interconnection of two particular subchannels. Signals on this logical ring interconnect ADM nodes 314-317. Other logical rings that can be configured from the four segments and two cross-connect nodes are depicted in FIGS. 4 and 5. In FIGS. 4 and 5, the links in each cross-connect node are now referred to collectively rather than individually. For instance, the four individual links interconnecting four separate subchannels in node 320 as referred to by reference numeral 320-4. In total, six logical rings can be constructed as depicted in FIGS. 3–5. Operations of each logical ring, both under normal and failure conditions, are similar to the operations described above for the "outer" logical ring 301*304 discussed with reference to FIG. 3.

Each segment operates independently. For example, the cross-connect nodes may be implemented to provide timing reference signals if the segments operate with synchronous signals.

Figure 6:
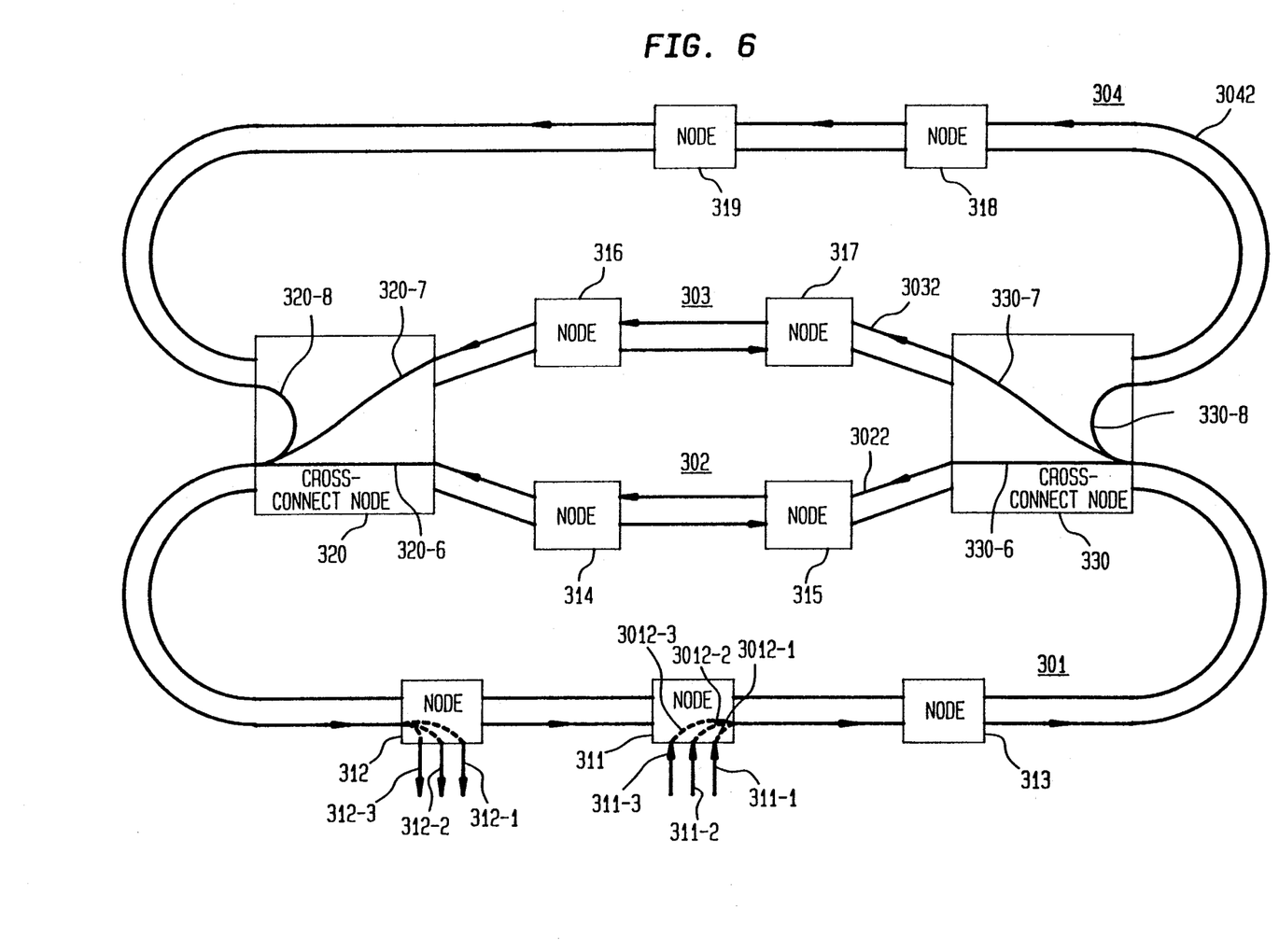
FIG. 6 is a block diagram of overlapping logical rings.

A logical ring may use only a portion of the transmission capacity available on each of its constituent segments. This allows parts of logical rings to overlap and share available transmission capacity on different segments. Such an arrangement could, for example, eliminate the need for a major upgrade/modification in a physical ring which must occur when all subchannel assignments are exhausted. As an example, with reference to FIG. 6, redundant communication paths between nodes 311 and 312 can be obtained by using logical ring 301*302. If the available transmission capacity of segment 302 cannot fully support the communications requirements between nodes 311 and 312, logical ring 301*303 and/or logical ring 301*304 can also be used. In FIG. 6, three incoming subrate signals 311-1, 311-2 and 311-3 enter node 311. These three signals are multiplexed onto path 3012 in the three subchannels denoted 3012-1, 3012-2, and 3012-3, respectively. Cross-connect node 330 is configured to fan-out subchannels to different segments so that subchannel 3012-1 is routed to path 3022 via link 330-6, subchannel 3012-2 is connected to path 3032 via link 330-7, and subchannel 3012-3 is transformed to path 3042 via link 330-8. At node 320, the subchannels fan-in from segments 302-304 via links 320-6 through 320-8 for propagation over path 3012. The subrate signals are then dropped as outgoing signals 312-1, 312-2, and 312-3 at node 312.

Figure 7:
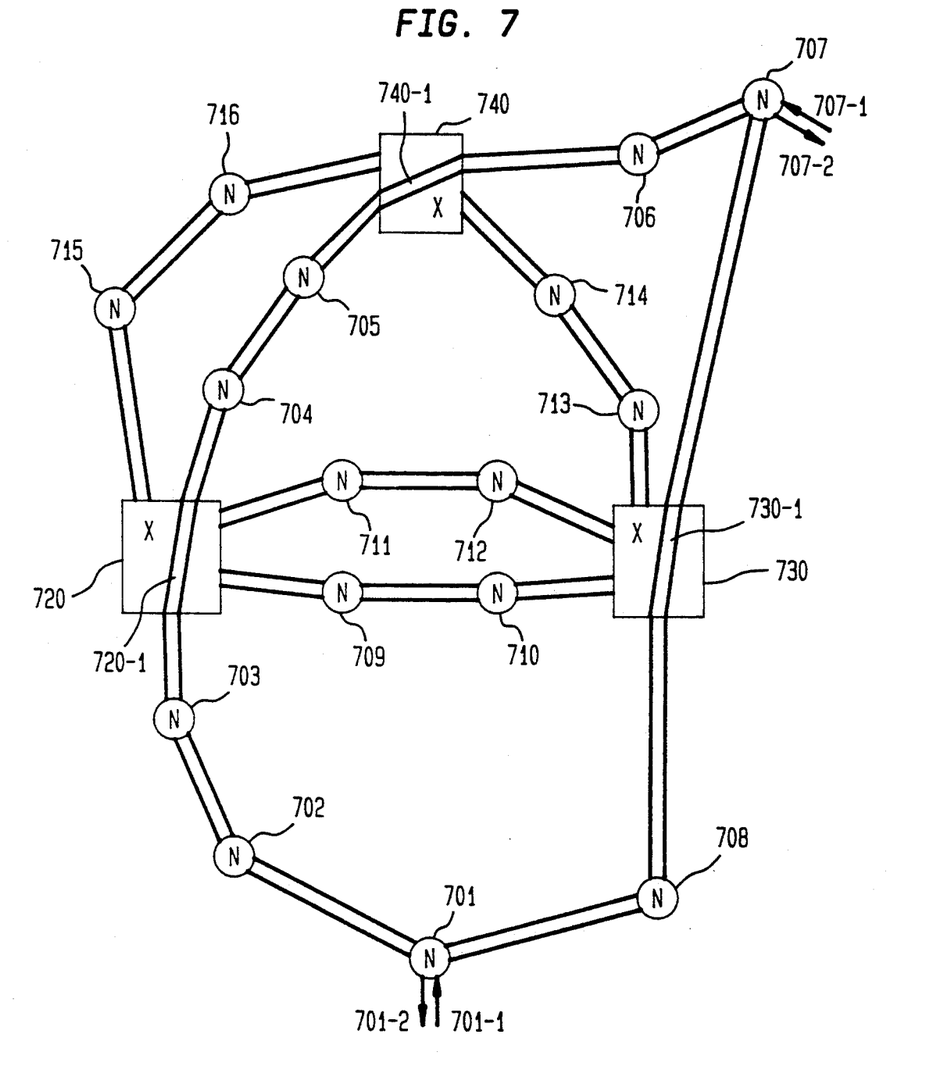
FIG. 7 is a block diagram of a general meshed network depicting one example of a self-healing, logical ring.

Although the present invention has been described primarily with reference to four segments and two cross-connect nodes, the description can be generalized to encompass whatever physical devices are used to connect subchannels between segments, numerous additional segments, and a plurality of cross-connect nodes. A configuration of a generalized self-healing logical ring in a meshed network is shown in FIG. 7, where ADM nodes are now depicted by a circle symbol. As an example, nodes 701 to 708 form such a logical ring using the cross-connect nodes 720, 730 and 740 which provide the necessary subchannel cross-connections shown collectively as 720-1, 730-1, and 740-1, respectively. Thus, for example, incoming signal 701-1 at node 701 can be dropped as signal 707-2 at node 707 via the exhibited logical ring.

Figure 8:
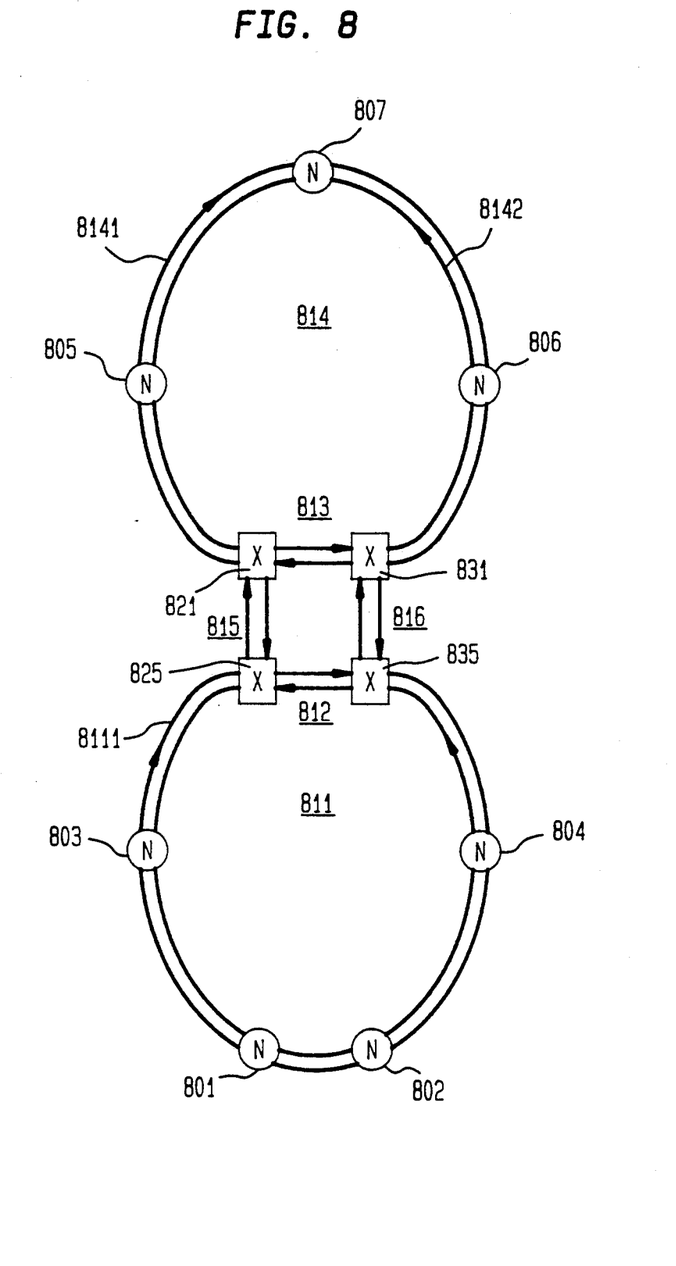
FIG. 8 is a block diagram of a cross-connect node arrangement to interconnect two physical hybrid rings.

A special case of ring interconnection is shown in FIG. 8. Six segments 811-816 are interconnected by cross-connect nodes 821, 825, 831, and 835. This is a special case in the sense that two physical, stand-alone hybrid rings (namely, a first ring originally formed by the cascade connection of segment 813 and 814 without interposed nodes 821, 825, 831 and 835; and a second ring originally formed by segments 811 and 812 in cascade without the interposed cross-connect nodes) have been partitioned into segments by the insertion of cross-connect nodes 821, 825, 831, and 835. The introduction of the cross-connect nodes now effects the interconnection of two originally independent, autonomous physical rings into a general self-healing network.

Figure 9:
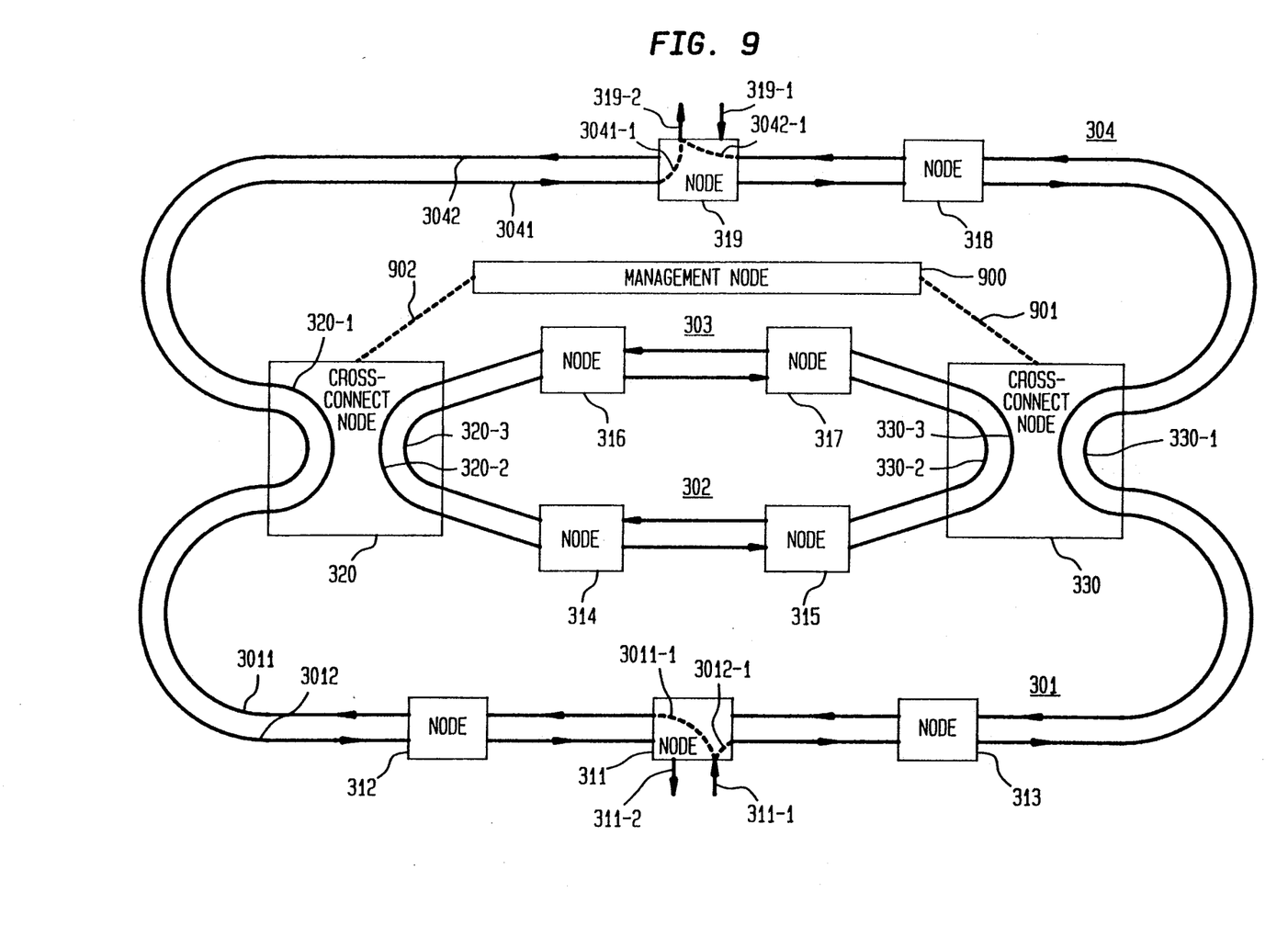
FIG. 9 is a block diagram of FIG. 3 showing a management node managing the set-up of the cross-connect nodes.

The foregoing description presumed that the cross-connect nodes route incoming subchannels to assigned outgoing channels. This assignment could be the result of, say, "hard-wiring" the cross-connect nodes on the basis of desired logical ring configurations. To provide even more flexibility, reconfiguration of the logical rings on a dynamic basis can be effected with management node 900 as depicted in FIG. 9. (This figure is basically FIG. 3 with node 900 shown in overlay fashion, so the reference numerals of FIG. 2 are used for like elements in FIG. 9). Node 900 manages each cross-connect node independently via information transmitted over data communication channels 901 and 902 coupled to nodes 330 and 320, respectively. Another arrangement for connecting management node 900 to the cross-connect nodes would be to directly link a subset of the cross-connect nodes with data communication channels and then utilize the logical rings to indirectly communicate node management information to the cross-connect nodes not directly linked to node 900. The information allows for node 900 to administer and coordinate subchannel assignments among the various cross-connect nodes, and node 900 can be implemented to issue commands to the cross-connect nodes to dynamically effect routing changes in the cross-connect nodes in order to reconfigure the logical rings.

It is to be understood that the above-described embodiment is simply illustrative of the principles in accordance with the present invention. Other embodiments may be readily devised by those skilled in the art which may embody the principles in spirit and scope. Thus, it is to be further understood that the circuit arrangement described herein is not limited to the specific forms shown by way of illustration, but may assume other embodiments limited only by the scope of the appended claims.

What is claimed is:

1. Circuitry for configuring a hybrid ring composed of pairs of unidirectional communication paths and add-drop multiplexer (ADM) nodes, the circuitry comprising a plurality of hybrid ring segments, each of said segments propagating multiplexed subchannels and operating at a given rate and each of said segments being independent of one another, and cross-connect nodes terminating each of the ends of said segments, each of said cross-connect nodes including means for routing said subchannels from an incoming one of said segments to an outgoing one of said segments to configure the hybrid ring as a logical ring composed of a cascade of predetermined ones of said segments and preselected ones of said cross-connect nodes so as to couple each of the ADM nodes to the other ADM nodes on the hybrid ring, the circuitry thereby being configured so that the propagation of said multiplexed subchannels over the hybrid ring is uninterrupted by the failure of any one of the ADM nodes, of any one of the paths, or of any one of said cross-connect nodes.

2. The circuitry as recited in claim 1, wherein said segments each propagates multiplexed subchannels independent of other segments.

3. The circuitry as recited in claim 2, wherein said segments each has a given number of subchannels independent of other segments.

4. The circuitry as recited in claim 2, wherein said segments each operates at said given rate independent of other segments.

5. The circuitry as recited in claim 2, wherein said segments each has a signal structure independent of other segments.

6. The circuitry as recited in claim 1 further comprising a management node, coupled to said cross-connect nodes, for configuring all of said cross-connect nodes.

7. Circuitry for configuring a plurality of hybrid rings each composed of pairs of unidirectional communication paths and add-drop multiplexer (ADM) nodes, the circuitry comprising a plurality of hybrid ring segments each propagating multiplexed subchannels and each of said segments being independent of one another, and cross-connect nodes terminating each of the ends of said segments, each of said cross-connect nodes including means for routing said subchannels from an incoming one of said segments to an outgoing one of said segments to configure the hybrid rings, each of the hybrid rings being formed as a logical ring composed of a cascade of predetermined ones of said segments and preselected ones of said cross-connect nodes so as to couple each ADM node to the other ADM nodes on each hybrid ring, the circuitry thereby being configured so that the propagation of said multiplexed subchannels over any of the hybrid rings is uninterrupted by the failure of any one of the ADM nodes, of any one of the paths, or of any one of said cross-connect nodes.

8. The circuitry as recited in claim 7 further comprising a management node, coupled to said cross-connect nodes, for configuring all of said cross-connect nodes.

9. Circuitry for configuring hybrid rings each composed of pairs of opposite direction, unidirectional communication paths and add-drop multiplexer (ADM) nodes, the circuitry comprising a plurality of hybrid ring segments each propagating multiplexed subchannels and each of said segments being independent of one another, and cross-connect nodes terminating each of the ends of the segments, each of said cross-connect nodes including means for routing each of said subchannels from an incoming one of said segments to an outgoing one of said segments so that said subchannels are partitioned for propagation over at least two of said outgoing segments to configure a plurality of the hybrid rings, each hybrid ring including a cascade of predetermined ones of said segments and preselected ones of said cross-connect nodes, thereby coupling each of the ADM nodes to other ADM nodes on each of the hybrid rings, the circuitry thereby being configured so that the propagation of said multiplexed subchannels over any of the hybrid rings is uninterrupted by the failure of any one of the ADM nodes, of any one of the paths, or of any one of said cross-connect nodes.

10. The circuitry as recited in claim 9 further comprising a management node, coupled to said cross-connect nodes, for configuring all of said cross-connect nodes.

11. A hybrid ring comprising pairs of unidirectional communication paths for propagating multiplexed subchannels, add-drop multiplexer (ADM) nodes interposed in at least some of said pairs, the combination of each pair of unidirectional communication paths with any said interposed ADM nodes forming a hybrid ring segment, which is independent of other hybrid ring segments formed by other of said pairs and interposed ADM nodes and cross-connect nodes terminating each of the ends of said segments and of said pairs without ADM nodes, each of said cross-connect nodes including means for routing said subchannels from an incoming one of said segments or of said pairs without ADM nodes to an outgoing one of said segments or of said pairs without ADM nodes to configure the hybrid ring as a cascade of predetermined ones of said segments or of said pairs without ADM nodes and preselected one of said cross-connect nodes, thereby coupling each of the ADM nodes to the other ADM nodes on the hybrid ring, the circuitry thereby being configured so that the propagation of said multiplexed subchannels over any of the hybrid rings is uninterrupted by the failure of any one of the ADM nodes, of any one of said paths, or of any one of said cross-connect nodes.

12. The circuitry as recited in claim 11 further comprising a management node, coupled to said cross-connect nodes, for configuring all of said cross-connect nodes.

13. Circuitry for configuring a hybrid ring composed of pairs of unidirectional communication paths and add-drop multiplexer nodes, the circuitry comprising a plurality of hybrid ring segments each propagating a signal composed of a plurality of multiplexed subrate channels and each of said segments being independent of one another, and cross-connect nodes terminating each of the ends of said segments, each of said nodes including means for demultiplexing each said signal propagating on each of said segments connected as an input to each said node to generate corresponding ones of said subrate channels, means for switching said corresponding ones of said subrate channels to assigned ones of said segments on a one-to-one basis, and means for multiplexing said corresponding ones of said subrate channels assigned to individual ones of said segments to propagate said corresponding ones of said subrate channels onto said individual ones of said segments, wherein selected ones of said hybrid ring segments and specified ones of said cross-connect nodes in combination realize the hybrid ring, the circuitry thereby being configured so that the propagation of said multiplexed subchannels over any of the hybrid rings is uninterrupted by the failure of any one of the ADM nodes, of any one of the paths, or of any one of said cross-connect nodes.

14. The circuitry as recited in claim 13 further comprising a management node, coupled to said cross-connect nodes, for configuring all of said cross-connect nodes.

15. A meshed network comprising a plurality of hybrid ring segments each composed of pairs of unidirectional communication paths propagating multiplexed subchannels and each of said segments being independent of one another, a plurality of add-drop multiplexer nodes, each of said hybrid ring segments being defined between two of said add-drop multiplexer nodes, and a plurality of cross-connect nodes, each of said cross-connect nodes being interposed between at least three of said hybrid ring segments for interconnecting the multiplexed subchannels of said hybrid ring segments connected to each of said cross-connect nodes into a plurality of possible hybrid rings for maintaining subchannels even in the presence of a failure of any one of said hybrid ring segments by rearranging the connection of said multiplexed subchannels into different ones of said possible hybrid rings, the network thereby being configured so that the propagation of said multiplexed subchannels over any of the hybrid rings is uninterrupted by the failure of any one of the ADM nodes, of any one of said paths, or of any one of said cross-connect nodes.

16. The circuitry as recited in claim 15 further comprising a management node, coupled to said cross-connect nodes, for configuring all of said cross-connect nodes.

17. Circuitry for configuring a hybrid ring composed of pairs of unidirectional communication paths and add-drop multiplexer (ADM) nodes, the circuitry comprising a plurality of hybrid ring segments each operating at a given rate independent of one another and each propagating multiplexed subchannels, and cross-connect nodes terminating each of the ends of said segments, each of said cross-connect nodes including means for routing said subchannels from an incoming one of said segments to an outgoing one of said segments to configure the hybrid ring as a logical ring composed of a cascade of predetermined ones of said segments and preselected ones of said cross-connect nodes so as to couple each of the ADM nodes to the other ADM nodes on the hybrid ring, the circuitry thereby being configured so that the propagation of said multiplexed subchannels over the hybrid ring is uninterrupted by the failure of any one of the ADM nodes, of any one of the paths, or of any one of said cross-connect nodes.

* * * * *